United States Patent
Fujieda et al.

(10) Patent No.: US 10,608,933 B2
(45) Date of Patent: Mar. 31, 2020

(54) DATA REPRODUCTION DEVICE FOR PLANT-MONITORING CONTROL SYSTEM

(71) Applicant: TOSHIBA MITSUBISHI-ELECTRIC INDUSTRIAL SYSTEMS CORPORATION, Chuo-ku (JP)

(72) Inventors: Hiroyuki Fujieda, Tokyo (JP); Katsuhiro Konishi, Tokyo (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 0 days.

(21) Appl. No.: 16/079,324

(22) PCT Filed: Mar. 31, 2016

(86) PCT No.: PCT/JP2016/060642
§ 371 (c)(1),
(2) Date: Aug. 23, 2018

(87) PCT Pub. No.: WO2017/168674
PCT Pub. Date: Oct. 5, 2017

(65) Prior Publication Data
US 2019/0052563 A1    Feb. 14, 2019

(51) Int. Cl.
*H04L 12/741* (2013.01)
*G05B 19/05* (2006.01)

(52) U.S. Cl.
CPC ............ *H04L 45/74* (2013.01); *G05B 19/054* (2013.01); *G05B 2219/1105* (2013.01); *G05B 2219/15023* (2013.01)

(58) Field of Classification Search
CPC .................. H04L 45/74; G05B 19/054; G05B 2219/1105; G05B 2219/15023
See application file for complete search history.

(56) References Cited

FOREIGN PATENT DOCUMENTS

| JP | 2001-184119 A | 7/2001 |
|---|---|---|
| JP | 2002-278606 A | 9/2002 |

(Continued)

OTHER PUBLICATIONS

English translation of JP 2001184119 provided by the applicant (Year: 2001).*

(Continued)

*Primary Examiner* — Ian N Moore
*Assistant Examiner* — Brian T Le
(74) *Attorney, Agent, or Firm* — Xsensus LLP

(57) ABSTRACT

A data reproduction device (1) is a data reproduction device for plant-monitoring control system to be newly connected to an existing network 6 in which a packet is transmitted/received between a PLC (2) that is operating and an input/output device (3, 4). A setting information storing portion (10) stores setting information. A process data definition information storing portion (11) stores process data definition information. A process data acquiring portion (13) acquires a binary data array stored in the packet. A process data analyzing portion (15) decomposes the binary data array into a plurality of pieces of process data based on the setting information and, for each of the plurality of pieces of process data, associates one piece of the process data among the plurality of pieces of process data, packet receiving time, and the process data definition information to obtain one piece of process data analysis information.

3 Claims, 14 Drawing Sheets

(56) References Cited

FOREIGN PATENT DOCUMENTS

JP   2009-301359 A   12/2009
JP   2013-206063 A   10/2013

OTHER PUBLICATIONS

English translation of JP 2009301359 provided by the applicant (Year: 2009).*
English translation of JP 2002278606 provided by the applicant (Year: 2002).*
English translation of JP 2013206063 provided by the applicant (Year: 2013).*
International Search Report dated Jun. 28, 2016 in PCT/JP2016/060642 filed Mar. 31, 2016.
International Preliminary Report on Patentability and Written Opinion dated Oct. 11, 2018 in PCT/JP2016/060642 (submitting English translation only).

* cited by examiner

DATA REPRODUCTION DEVICE FOR PLANT-MONITORING CONTROL SYSTEM

FIELD

This disclosure relates to a data reproduction device for plant-monitoring control system, and particularly to a data reproduction device for plant-monitoring control system having a network search function.

BACKGROUND

A plant-monitoring control system is a system in which a programmable logic controller (PLC) which controls a plant and an input/output device are mutually connected via a network. The input/output device is an I/O connected to apparatuses (sensors and actuators) constituting the plant and a monitoring control device operated by an operator, which is a monitoring control device as a human machine interface (later HMI) with display items and operation items provided on a screen. PTL 1 discloses a data reproduction device connected to a network.

A conventional data reproduction device is designed as one communication apparatus on a network in advance at a design stage of a plant-monitoring control system. The programmable logic controller converts process data transmitted from the programmable logic controller to the input/output device and process data transmitted from the input/output device to the programmable logic controller to a dedicated data format which the conventional data reproduction device can understand. The programmable logic controller stores process data converted to the dedicated data format in a packet for which the data reproduction device is specified as a transmission destination address to transmit the packet. The conventional data reproduction device receives this packet and acquires the process data.

Thus, the dedicated data format is specified for the conventional data reproduction device, and it is necessary, even when process data is transmitted from the PLC or the input/output device by broadcast, for the PLC to convert the process data to the dedicated data format and separately transmit the process data to the data reproduction device.

Therefore, in the conventional data reproduction device, it is necessary to, in order to change process data to be acquired by the data reproduction device, change a communication program of the programmable logic controller that is operating to transmit the data to the data reproduction device, change settings for a network card (including an onboard one) that is operating and change settings for a monitoring control device (hereafter called HMI) and a data transmission process.

CITATION LIST

Patent Literature

[PTL 1] JP 2013-206063A

SUMMARY

Technical Problem

By the way, there may be a case where, at the time of replacing an existing plant-monitoring control system, it is desired, in order to analyze an operation state of the existing system, to add a new data reproduction device to a network and acquire data which flows through the network of the plant-monitoring control system and which changes over time as process data. In this case, in the conventional data reproduction device described above, it is necessary to change the communication program of the programmable logic controller. In order to change the communication program, an engineer is required. It is also necessary to temporarily stop plant-monitoring control to reflect the communication program.

Further, if a load of a control process of the programmable logic controller is already high, it is necessary to additionally install a programmable logic controller for the data reproduction device.

Furthermore, since it is necessary to change settings for the network card (including an onboard one) accompanying addition of the programmable logic controller, it is necessary to temporarily stop network communication in order to reflect setting data on all apparatuses of the network.

Furthermore, if a communication load of the network is increased by increase in an amount of communication to the data reproduction device, necessity of slowing down a transmission cycle of the network and additionally installing a network dedicated for the data reproduction device also occurs.

Furthermore, in order to acquire process data from the monitoring control device (HIM), an engineer is required to change settings for the monitoring control device (HMI) and a communication process of the monitoring control device (HMI). Further, it is also necessary to stop the monitoring control device (HMI) to reflect changes and send settings and changed data to all monitoring control devices (HMI). Further, if a load of a control process of the monitoring control devices (HMI) is already high, it is necessary to additionally install a monitoring control device (HMI) for the data reproduction device.

As described above, a lot of labor and time is required to use a conventional data reproduction device. In some cases, additional installation costs are required. If it is not possible to secure time and expenses, the data reproduction device cannot be used, and it is difficult to intuitively grasp a state of plant-monitoring control.

This disclosure has been made to solve the problem as described above, and an object is to provide a data reproduction device capable of, without changing settings for a programmable logic controller that is operating and an input/output device in an existing network, analyzing process data of an existing plant.

Solution to Problem

In order to achieve the above object, this disclosure is a data reproduction device for plant-monitoring control system to be newly connected to an existing network in which a packet is transmitted/received between a programmable logic controller that is operating and an input/output device, the data reproduction device for plant-monitoring control system comprising:

a setting information storing portion storing setting information in which address information including a transmission destination address and a transmission source address and stored in a header portion of the packet and a plurality of pieces of offset information specifying separation positions for decomposing a binary data array stored in a data portion of the packet by relative addresses from a start address of the data portion are associated;

a process data definition information storing portion storing, for each of the plurality of pieces of offset information, process data definition information in which one piece of the offset information among the plurality of pieces of offset information, the address information, a unique variable name for a combination of the one piece of offset information and the address information, and a comment explaining a meaning of the variable name are associated;

a process data definition information editing portion capable of editing the variable name and the comment included in the process data definition information;

a process data acquiring portion acquiring, among packets flowing through the existing network, a packet in which the data reproduction device for plant-monitoring control system is not specified in the address information stored in a header portion of the packet, and acquiring the binary data array stored in a data portion of the acquired packet;

a process data analyzing portion decomposing the binary data array acquired by the process data acquiring portion into a plurality of pieces of process data showing states of input/output points of the input/output device based on the setting information and, for each of the plurality of pieces of process data, associating one piece of the process data among the plurality of pieces of process data, packet receiving time, and the process data definition information to obtain one piece of process data analysis information;

a process data storing portion storing the process data analysis information; and a display portion searching for information corresponding to a specified variable name from a plurality of pieces of process data analysis information stored in the process data storing portion and displaying the information as time-series data.

Advantageous Effects of Invention

According to this disclosure, it is possible to, without changing settings for a programmable logic controller that is operating and an input/output device in an existing network, analyze process data of an existing plant. Therefore, it is possible to visually grasp a monitoring control state of a plant in a short time and at a low cost.

DESCRIPTION OF EMBODIMENTS

Figure 1:
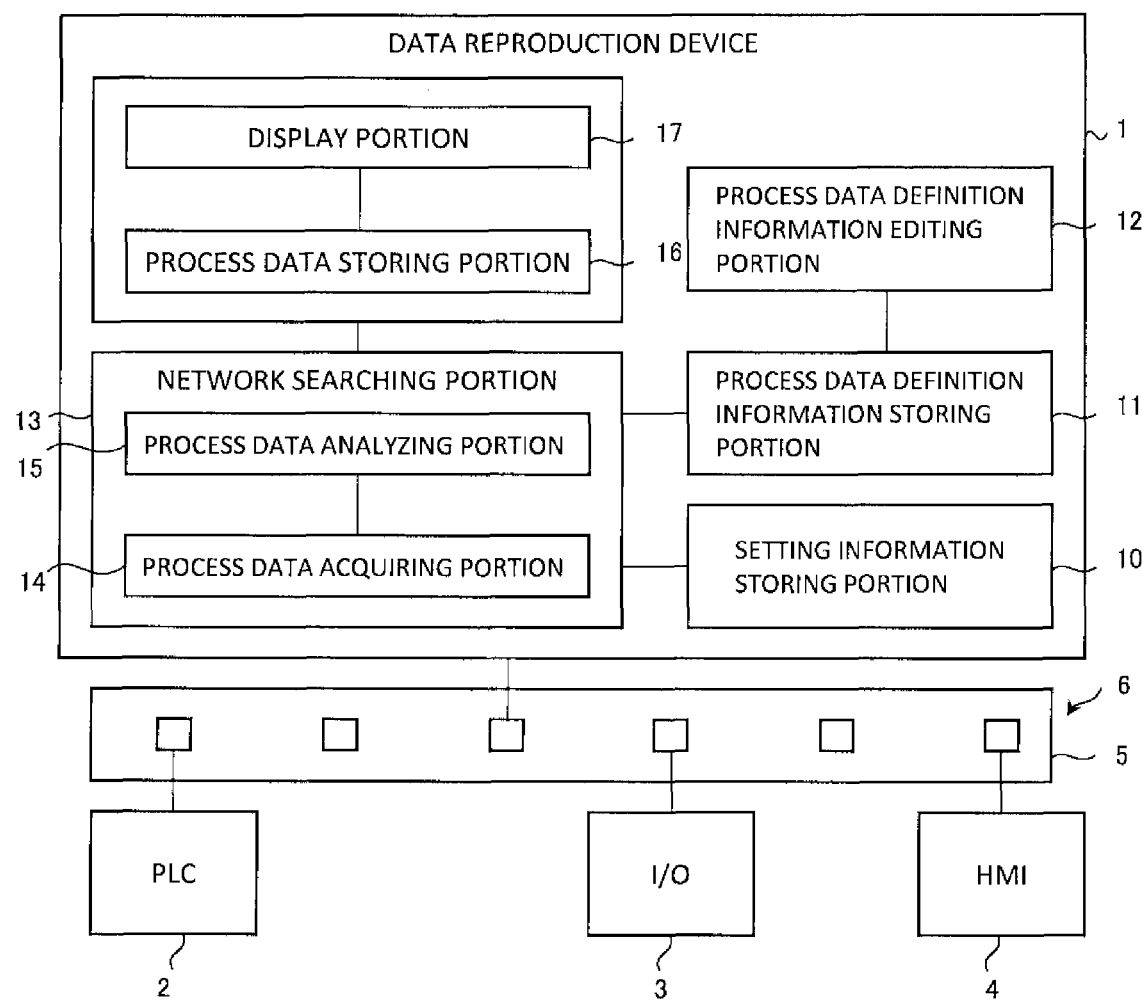
FIG. 1 is a conceptual configuration diagram of an existing plant-monitoring control system and a data reproduction device according to a first embodiment of the present disclosure.

Embodiments of the present disclosure will be described below in detail with reference to drawings. Components common to figures are given the same reference numeral, and repeated explanation will be omitted.

First Embodiment

FIG. 1 is a conceptual configuration diagram of an existing plant-monitoring control system and a data reproduction device according to a first embodiment of the present disclosure.

<Existing Plant-Monitoring Control System>

The existing plant-monitoring control system is configured with a programmable logic controller (PLC) 2 which controls a plant and an input/output device, the PLC 2 and the input/output device being connected via an existing network 6.

The input/output device is an I/O 3 and a human machine interface (hereinafter an HMI) 4. The I/O 3 is connected to hardware apparatuses (sensors and actuators) constituting the plant. The HMI 4 is a monitoring control device provided with a monitoring control screen which an operator operates. On the monitoring control screen, display items and operation items are arranged. The display items are, for example, software parts which display output values of the sensors. The operation items are, for example, software parts which give specified values to the actuators.

Figure 2:
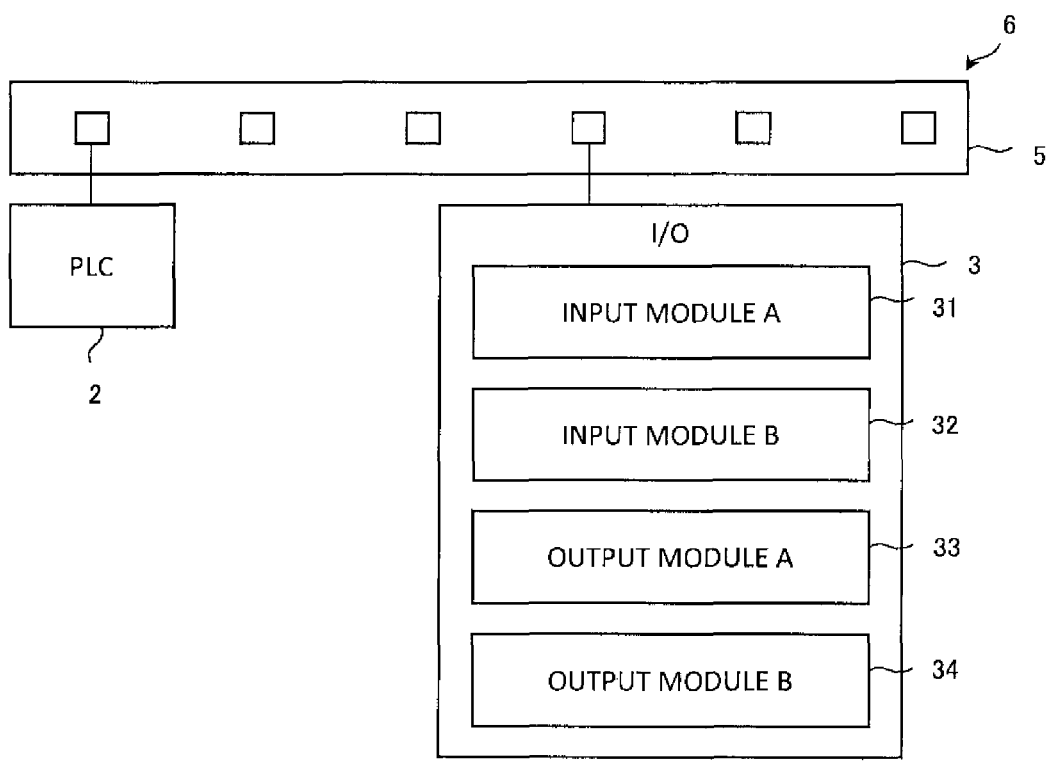
FIG. 2 is a diagram showing an example of modules which an input/output device has.

FIG. 2 is a diagram showing an example of modules which the input/output device has. The input/output device shown in FIG. 2 is the I/O 3. The I/O 3 is provided with an input module A 31, an input module B 32, an output module A 33 and an output module B 34. The input module A 31 and the input module B 32 are, for example, sensors, such as a temperature sensor and a speed sensor, which monitor plant facilities. The output module A 33 and the output module B 34 are, for example, actuators, such as a valve and a motor, which control the plant facilities.

Though the I/O 3 will be described as an example of the input/output device in the present specification, the input/output device may be the HMI 4. In the HMI 4, the input modules are display items which display output values of the sensors. The output modules are operation items which output specified values to the actuators by operations of the operator.

An existing network 6 is provided with a hub 5. The hub 5 is a network line concentrator provided with a plurality of ports. The PLC 2, the I/O 3 and the HMI 4 are connected to ports of the hub 5, respectively.

<Packet Flowing Through Existing Network>

In the system configuration as described above, a packet (a communication message) is transmitted/received between the PLC 2 and the input/output device (the I/O 3, the HMI 4) in the existing network 6. In the present specification, the packet means an information transmission unit, and the packet does not depend on a particular protocol.

Figure 3:
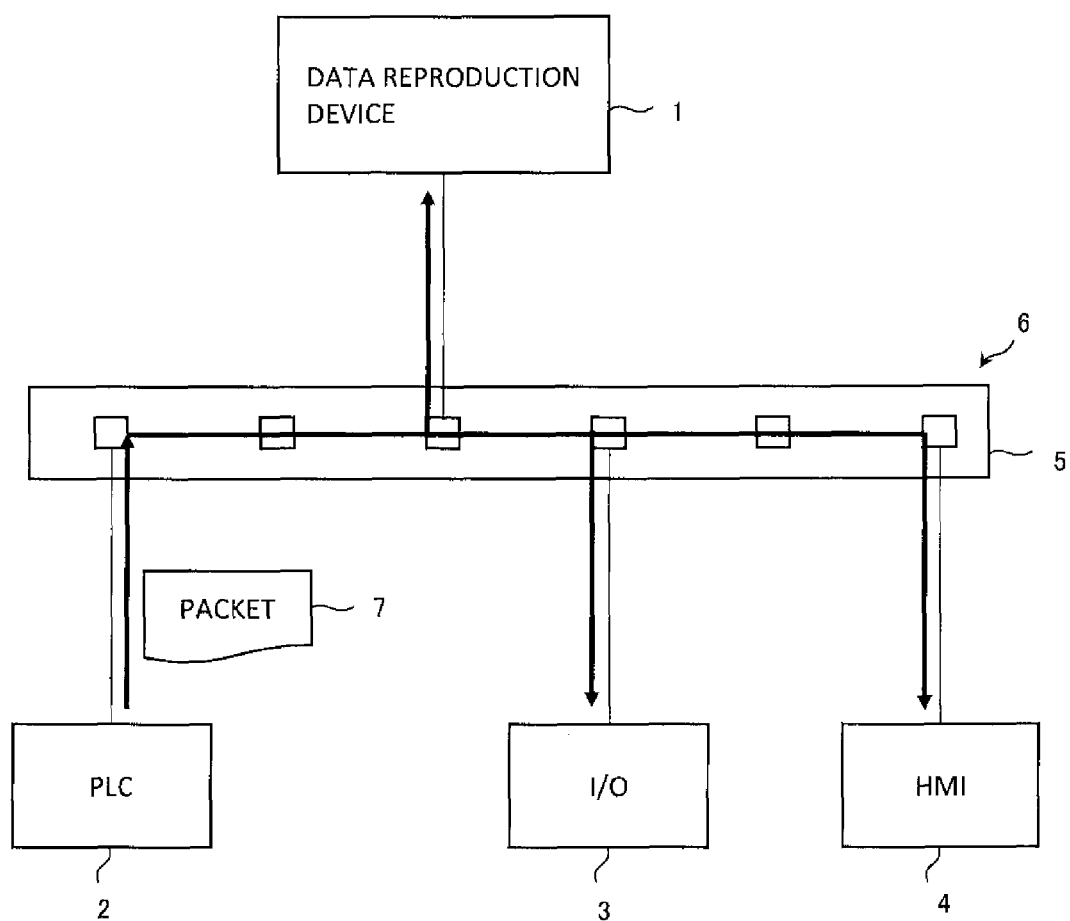
FIG. 3 is a diagram showing transmission of a packet in the first embodiment.

FIG. 3 is a diagram showing transmission of a packet in the first embodiment. As shown in FIG. 3, a packet 7 transmitted from the PLC 2 to the I/O 3 or the HMI 4 is communicated via the hub 5. In the first embodiment, a protocol is adopted in which the packet 7 is broadcast to all apparatuses connected to the hub 5. Otherwise, the hub 5 is a repeater hub in which the packet 7 transmitted to one port is transmitted to all the ports. Therefore, the packet 7 reaches a data reproduction device 1 connected to the existing network 6.

Figure 4:
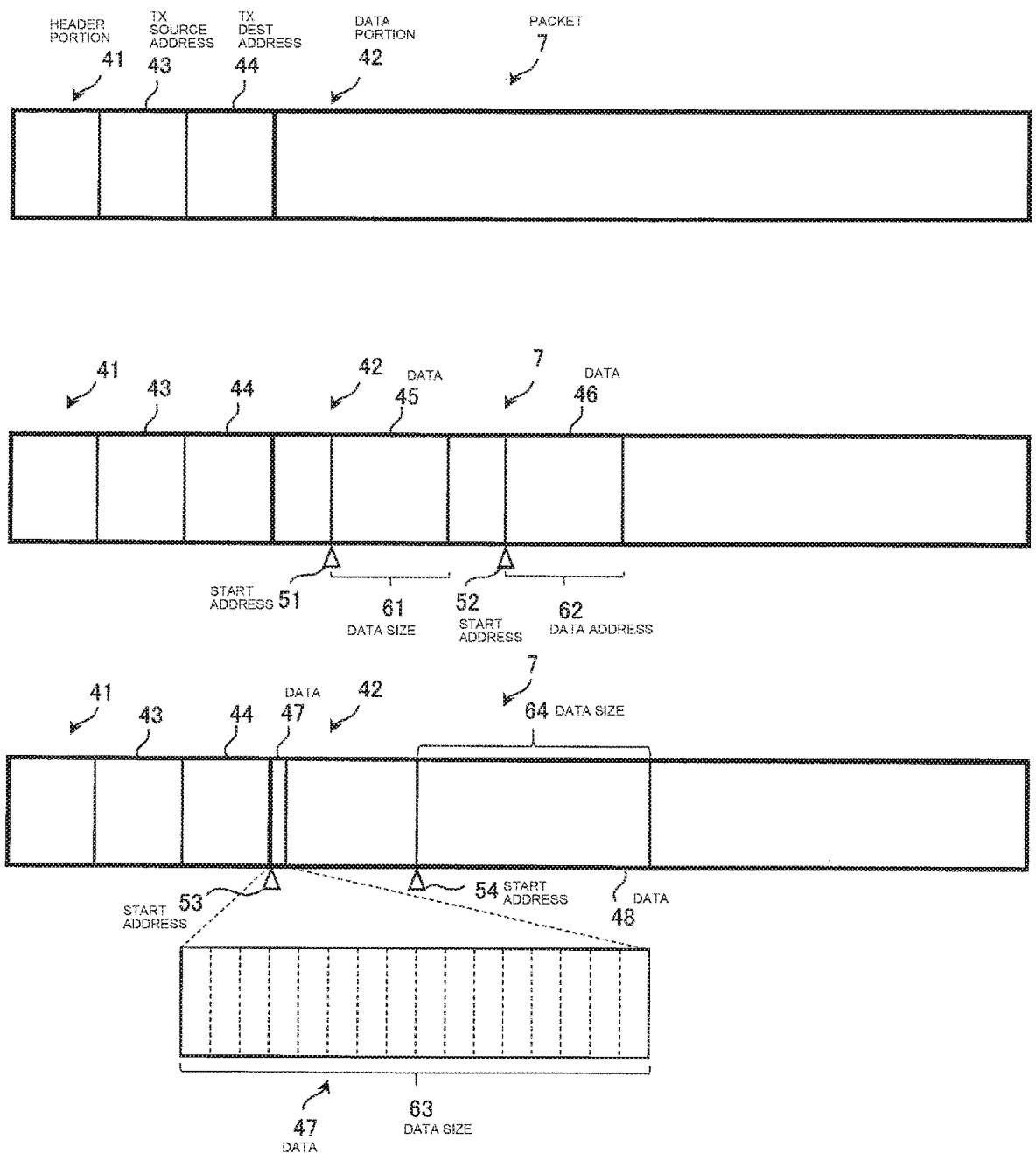
FIG. 4 is a diagram for illustrating a configuration of a packet 7.

FIG. 4 is a diagram for illustrating a configuration of the packet 7.

A figure at the top of FIG. 4 shows a basic configuration of the packet 7. The packet 7 is provided with a header portion 41 and a data portion 42. In the header portion 41, at least address information is stored. The address information includes a transmission source address 43 and a transmission destination address 44. In the data portion 42, a binary data array is stored in which pieces of process data showing states of input/output points of the input/output device are arrayed.

A figure in the middle of FIG. 4 shows a configuration of the packet 7 transmitted from the I/O 3 to the PLC 2 in the configuration shown in FIG. 3. As the address information, an address of the I/O 3 is specified as the transmission source address 43, and an address of the PLC 2 is specified as the transmission destination address 44. The address information shows IP addresses if the network is an Ethernet® network.

In the data portion 42, data 45 of the input module A 31 and data 46 of the input module B 32 are stored. A start address 51 is a start address of the data 45. A start address 52 is a start address of the data 46. A data size 61 is a data length of the data 45. A data size 62 is a data length of the data 46.

A figure at the bottom of FIG. 4 shows a configuration of the packet 7 transmitted from the PLC 2 to the I/O 3 in the configuration shown in FIG. 4. As the address information, the address of the PLC 2 is specified as the transmission source address 43, and the address of the I/O 3 is specified as the transmission destination address 44. The address information shows IP addresses if the network is an Ethernet® network.

In the data portion 42, data 47 of the output module A 33 and data 48 of the output module B 34 are stored. A start address 53 is a start address of the data 47. A start address 54 is a start address of the data 48. A data size 63 is a data length of the data 47. A data size 64 is a data length of the data 48.

Figure 5:
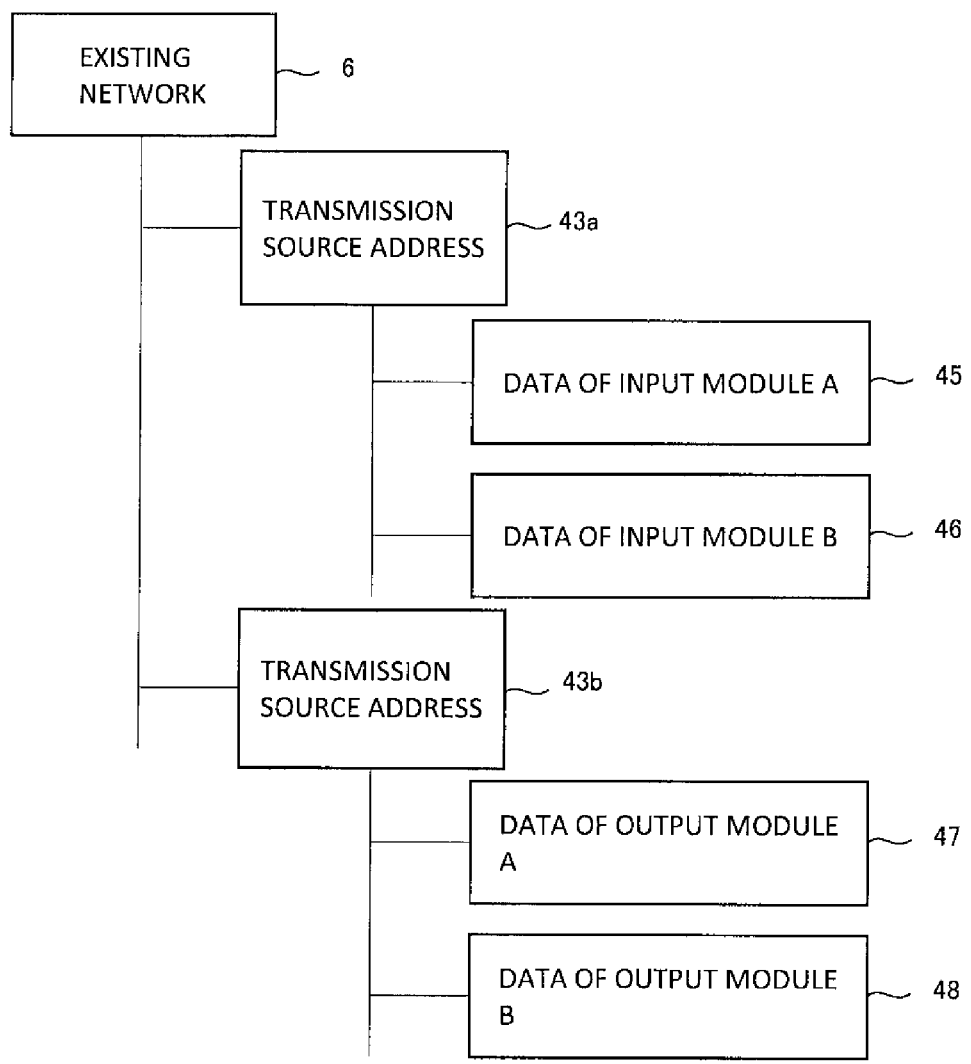
FIG. 5 is a diagram in which data of the modules related to address information is expressed in a tree form.

FIG. 5 is a diagram in which data of modules related to address information is expressed in a tree form.

As shown in FIG. 5, the address information and pieces of data of the modules can be expressed in a tree form as parent nodes and child nodes, respectively. Specifically, a transmission source address 43a is the address of the I/O 3. The data 45 of the input module A 31 and the data 46 of the input module B 32 are associated with the transmission source address 43a. A transmission source address 43b is the address of the PLC 2. The data 47 of the output module A 33 and the data 48 of the output module B 34 are associated with the transmission source address 43b.

Figure 6:
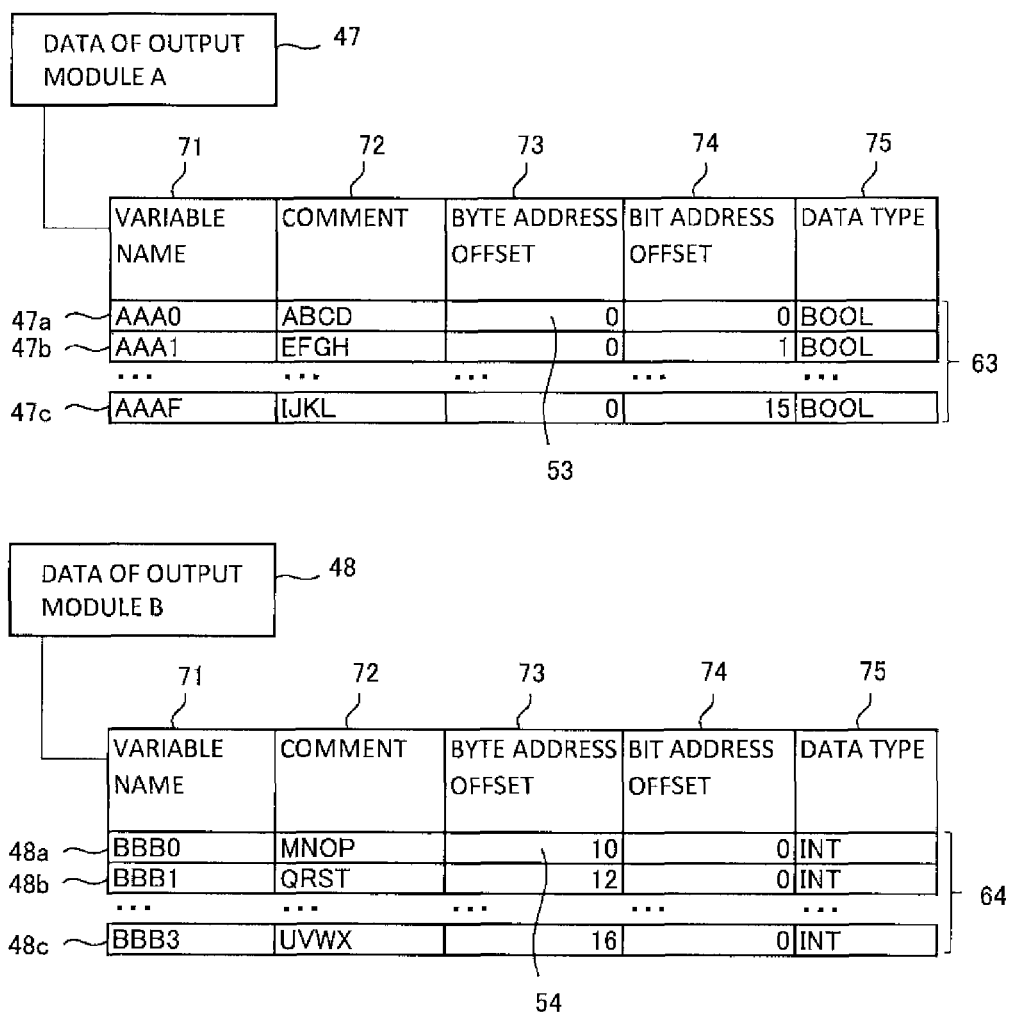
FIG. 6 is a diagram for illustrating a relationship between a configuration of the modules which the input/output device has and process data.

FIG. 6 is a diagram for illustrating a relationship between a configuration of the modules which the input/output device has and process data. The modules which the input/output device has have a plurality of input/output points (input points and output points), and one piece of process data corresponds to a state of one input/output point. Further, since data of each module is associated with address information as described with regard to FIG. 5, each input/output point in FIG. 6 is associated with address information.

A figure at the top of FIG. 6 shows an example of a case where the output module A 33 is a module having sixteen digital output points. The data 47 of the output module A 33 is data in which a byte address offset at each of the output points is the same, but a bit address offset is incremented by one bit among the output points.

As shown in the figure at the top of FIG. 6, the data 47 of the output module A 33 can be expressed being divided in pieces of data corresponding to the output points (0-th data 47a of the output module A 33, 1st data 47b of the output module A 33, . . . , 15th data 47c of the output module A). In order to distinguish among the pieces of data, each of variable names 71 and comments 72 is given a character string which does not duplicate with variable names 71 and comments 72 of other pieces of data.

In the figure at the top of FIG. 6, byte address offsets 73 are the same. Here, the start address 53 of the data 47 of the output module A 33 is 0, and the byte address offset 73 is also 0. The bit address offsets 74 are different among the pieces of data. The bit address offset 74 of the 0-th data 47a is 0; the bit address offset 74 of the 1st data 47b is 1, and the bit address offset 74 of the 15th data 47c is 15. A data type 75 is BOOL. A data size 63 of the output module A 33 corresponds to an address length from the 0-th data 47a to the 15th data 47c.

A figure at the bottom of FIG. 6 shows an example of a case where the output module B 34 is a module having four analog output points. The data 48 of the output module B 34 is data in which a byte address offset 73 is incremented by two bytes among the output points, and bit address offsets are zero.

As shown in the figure at the bottom of FIG. 6, the data 48 of the output module B can be expressed being divided in pieces of data corresponding to the output points (0-th data 48a of the output module B 34, 1st data 48b of the output module B 34, . . . , 3rd data 48c of the output module B 34). In order to distinguish among the pieces of data, each of variable names 71 and comments 72 is given a character string which does not duplicate with variable names 71 and comments 72 of other pieces of data.

In the figure at the bottom of FIG. 6, the byte address offset 73 is incremented by two bytes. Here, if the start address 54 of the data 48 of the output module B 34 is 10, the byte address offset 73 of the 0-th data 48a is 10, the byte address offset 73 of the 1st data 48b is 12, and the byte address offset 73 of the 3rd data 48c is 16. All the bit address offsets 74 are 0. The data type 75 is INT. A data size 64 of the output module B 34 corresponds to an address length from the 0-th data 48a to the 3rd data 48c.

<Data Reproduction Device>

Return to FIG. 1, the description will be continued. The data reproduction device 1 is a data reproduction device for plant-monitoring control system which is newly connected to the existing network 6 in which a packet 7 is transmitted/received between the PLC 2 that is operating and the input/output device.

The data reproduction device 1 is provided with a setting information storing portion 10, a process data definition information storing portion 11, a process data definition information editing portion 12, a network searching portion 13, a process data storing portion 16 and a display portion 17.

The setting information storing portion 10 stores filters and setting information in advance. The filters define formats for capturing particular traffic flowing through the existing network 6. In the setting information storing portion 10, a plurality of filters to be selected by the operator are defined.

The setting information includes at least information in which address information and a plurality of pieces of offset information are associated. The setting information may include a configuration of each module of the input/output device and data type. As described above, the address information is stored in the header portion 41 of the packet 7 and includes a transmission destination address and a transmission source address.

The plurality of pieces of offset information are pieces of information specifying separation positions for decomposing the binary data array stored in the data portion 42 of the packet 7 by relative addresses from the start address of the data portion 42. Each piece of offset information is defined, for example, by a combination of the byte address offset 73 and the bit address offset 74 of data of each output point (for example, the 0-th data 47a) shown in FIG. 6. According to the pieces of offset information, it is possible to interpret the number of bits or the number of bytes into which each piece of the binary data array is broken up into and which data type each broken up element (process data) is to be treated as.

The binary data array is such that states of the input points of the input modules which the input/output device has and states of the output points of the output modules are arrayed. The binary data array is, for example, the whole process data stored in the data portion 42 in the figure at the bottom of FIG. 4, and the data 47 of the output module A 33 and the data 48 of the output module B 34 are a part of the binary data array.

The setting information required for analysis of the packet 7 is acquired from an engineering tool of the PLC 2. Specifically, the setting information is the address of the PLC 2, the address of the input/output device (the I/O 3, the HMI 4), the configuration (the input/output points) of each module of the input/output device, byte address offsets, bit address offsets and data types. Since these are information required for programming for the PLC 2 and design for transmission/reception of data to the input/output device, they are necessarily written in the engineering tool. Depending on the engineering tool, these may be acquired by a setting information export function.

The process data definition information storing portion 11 stores process data definition information in advance. The process data definition information is information in which one piece of offset information among the plurality of offset information described above, address information, a unique variable name for a combination of the one piece of offset information and the address information, and a comment explaining the variable name are associated. That is, as shown in FIG. 6, the process data definition information is information defined for each input/output point of the modules which the input/output device has, and identified with address information and one piece of offset information in setting information as a key. As the variable name 71 shown in FIG. 6, a name which does not duplicate may be automatically decided based on a network name and a byte address offset. As the variable name 71, a variable name written in the engineering tool may be used. As the comment 72, a comment written in the engineering tool may be used or manually inputted, or a blank space may be left.

Further, the variable name and the comment which are included in the process data definition information can be edited by the process data definition information editing portion 12 operated by the operator.

The network searching portion 13 is provided with a process data acquiring portion 14 and a process data analyzing portion 15. Using a filter and setting information acquired from the setting information storing portion 10 and process data definition information acquired from the process data definition information storing portion 11, the network searching portion 13 acquires process data from a packet 7 flowing through the existing network 6, analyzes the process data and accumulates an analysis result into the process data storing portion 16.

The network searching portion 13 captures a packet 7 in a format corresponding to a selected filter from traffic flowing through the existing network 6.

The process data acquiring portion 14 acquires such a packet that the data reproduction device 1 is not specified in address information stored in a header portion of the packet 7. In other words, the process data acquiring portion 14 acquires such a packet that the PLC 2 or the input/output device (the I/O 3 or the HMI 4) is specified as the transmission destination address 44 in the header of the packet 7. Furthermore, the process data acquiring portion 14 acquires a binary data array stored in a data portion of the acquired packet 7. As described above, the binary data array is such that states of the input points of the input modules which the input/output device has and states of the output points of the output modules are arrayed.

The process data analyzing portion 15 decomposes the binary data array acquired by the process data acquiring portion 14 into a plurality of pieces of process data showing states of the input/output points of the modules which the input/output device has, based on the setting information. As described above, a plurality of pieces of offset information associated with the address information stored in the header portion of the packet 7 are defined in the setting information. The plurality of pieces of offset information are information specifying separation positions for decomposing the binary data array, and, for example, it is defined that the binary data array is to be separated in 1-bit units from the 0-th byte to the 10-th byte and is to be separated in 2-byte units from the 10-th byte to the 20-th byte. Each of separated pieces of data is process data.

Furthermore, for each of the plurality of pieces of process data, the process data analyzing portion 15 associates one piece of the process data among the plurality of pieces of process data, packet receiving time and process data definition information to obtain one piece of process data analysis information. That is, process data showing a state of each of the input/output points of the modules which the input/output device has, at each time is associated with the process data definition information (FIG. 6) defined for each input/output point. As a key of the process data analysis information, the variable name 71 (FIG. 6) of the process data definition information is used.

For example, the plurality of pieces of process data extracted by the process data analyzing portion 15 are arranged in a tree shape as data of the modules associated with the address information as shown in FIG. 5. Furthermore, each piece of process data is associated with process data definition information having address information, a byte address offset 73 and a bit address offset 74 corresponding to those of the piece of process data in the process data definition information list shown in FIG. 6.

The process data storing portion 16 stores the process data analysis information which the process data analyzing portion 15 has generated. For the process data analysis information accumulated in the process data storing portion 16, process data at each time can be acquired with a variable name as a key.

The display portion 17 searches for information corresponding to a specified variable name from the plurality of pieces of process data analysis information stored in the process data storing portion 16 and displays the information as time-series data.

The process data storing portion 16 accumulates pieces of process data for each variable (for each input/output point of the modules), and the operator selects a target piece of process data from among variable names and comments added to the pieces of process data. Specifically, when the operator selects one module from a tree display screen shown in FIG. 5 using a keyboard 28 and a mouse 29 in FIG. 8 to be described later, the list shown in FIG. 6 is displayed. When one row is selected from the list, the display portion 17 searches for process data analysis information corresponding to a variable name of the selected row. A search result is displayed on a monitor 27 in FIG. 8 to be described later as process data at each time in a tabular or graphical form. In the graphical-form display, a displayed time width and value range width of the graph can be changed with the mouse 29.

<Flowchart>

Figure 7:
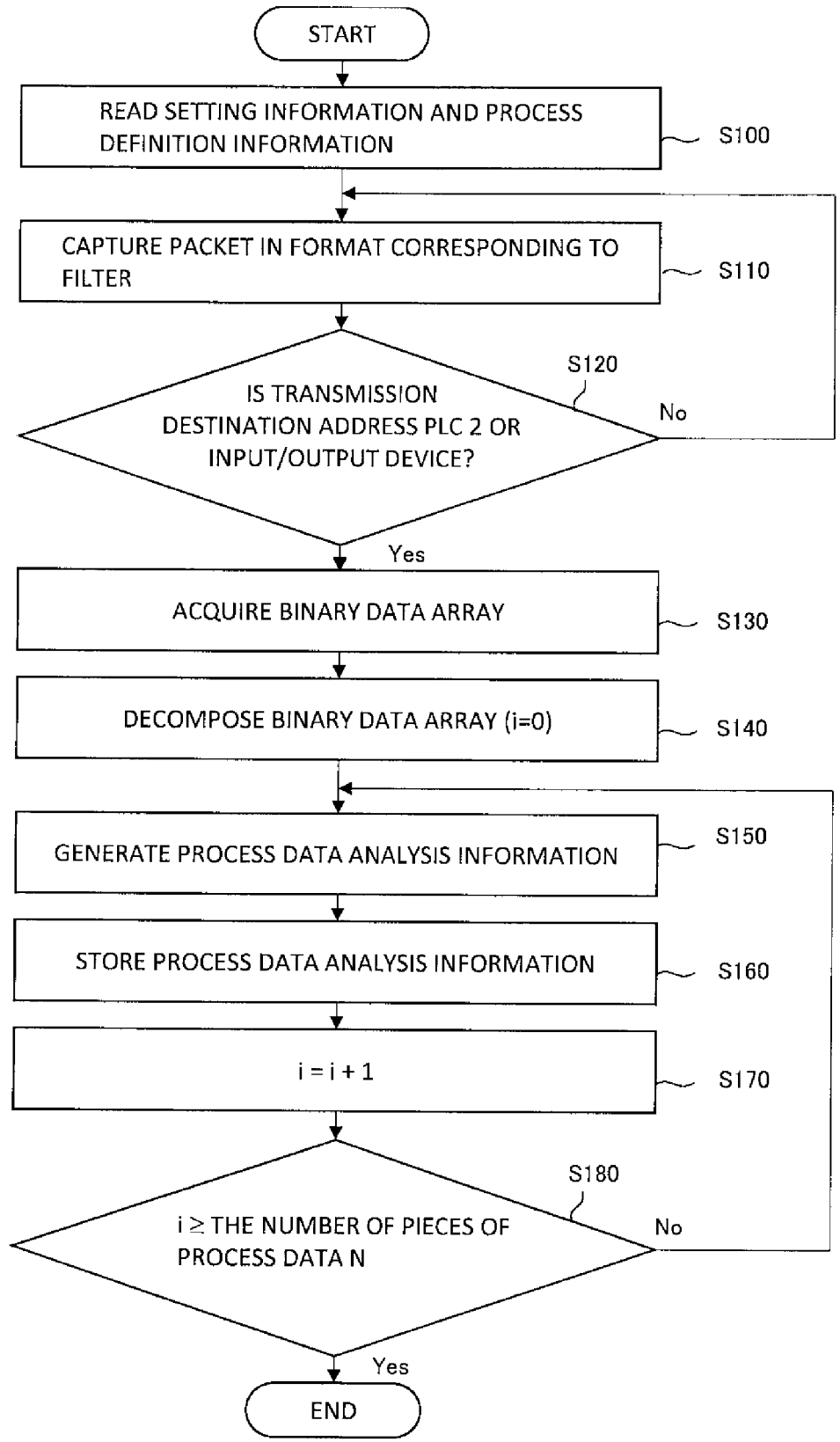
FIG. 7 is a flowchart for illustrating a process routine of a network searching portion 13, which a data reproduction device 1 according to the first embodiment of the present disclosure executes.

Next, an operation of the data reproduction device 1 will be described. FIG. 7 is a flowchart for illustrating a process routine of the network searching portion 13, which is executed by the data reproduction device 1 according to the first embodiment of the present disclosure.

At step S100, the network searching portion 13 reads a filter and setting information from the setting information storing portion 10, and process data definition information from the process data definition information storing portion 11.

At step S110, the network searching portion 13 captures a packet 7 in a format corresponding to the selected filter.

At step S120, the process data acquiring portion 14 judges whether or not a transmission destination address stored in a header portion of the packet 7 captured at step S110 is the PLC 2 or the input/output device (the I/O 3 or the HMI 4). If the judgment condition is satisfied, the process data acquiring portion 14 executes a process of S130 next. If the judgment condition is not satisfied, the flow returns to step S110, and the process is continued.

At step S130, the process data acquiring portion 14 acquires a binary data array stored in a data portion of the packet 7.

At step S140, the process data analyzing portion 15 decomposes the binary data array acquired at step S130. Specifically, the process data analyzing portion 15 decomposes the binary data array into pieces of process data according to offset information in the setting information. The number of the pieces of process data is assumed to be N, and an initial value 0 is set for an index i.

At step S150, the process data analyzing portion 15 associates the i-th piece of process data, packet receiving time and process data definition information to generate process data analysis information. The process data definition information is identified based on address information stored in the header portion of the packet, which has been captured at step S110, and the offset information in the setting information used at step S140.

At step S160, the network searching portion 13 causes the process data analysis information generated at step S150 to be stored into the process data storing portion 16.

At step S170, the network searching portion 13 adds 1 to the index i.

At step S180, the network searching portion 13 judges whether or not the index i is equal to or larger than the number of pieces of process data N. If the judgment condition is satisfied, it can be determined that analysis of all pieces of process data stored in the data portion of the packet 7 has been completed, and, therefore, the present routine is ended. On the other hand, if the judgment condition is not satisfied, the flow returns to step S150, and the process is continued.

In another routine, the display portion 17 searches process data analysis information accumulated in the process data storing portion 16 with a variable name selected by the operator. The display portion 17 causes process data at each time, which is a search result, to be displayed on the monitor 27 in FIG. 8 to be described later in a tabular or graphical form.

<Effects>

As described above, according to the data reproduction device 1 of the first embodiment of the present disclosure, it is possible to, without changing a program of the PLC 2 that is operating or settings for the input/output device, acquire data which is transmitted by broadcast in the existing network 6 and has changed over time as process data. Further, the acquired process data at each time is associated with an input/output point of the modules which the input/output device has and can be displayed in a tabular or graphical form.

Therefore, according to the data reproduction device 1, it is possible to, without increasing a communication load of an existing plant-monitoring control system, visually and intuitively grasp a monitoring control state of a plant in a short period and at a low cost.

<Hardware Configuration Example of Data Reproduction Device 1>

Figure 8:
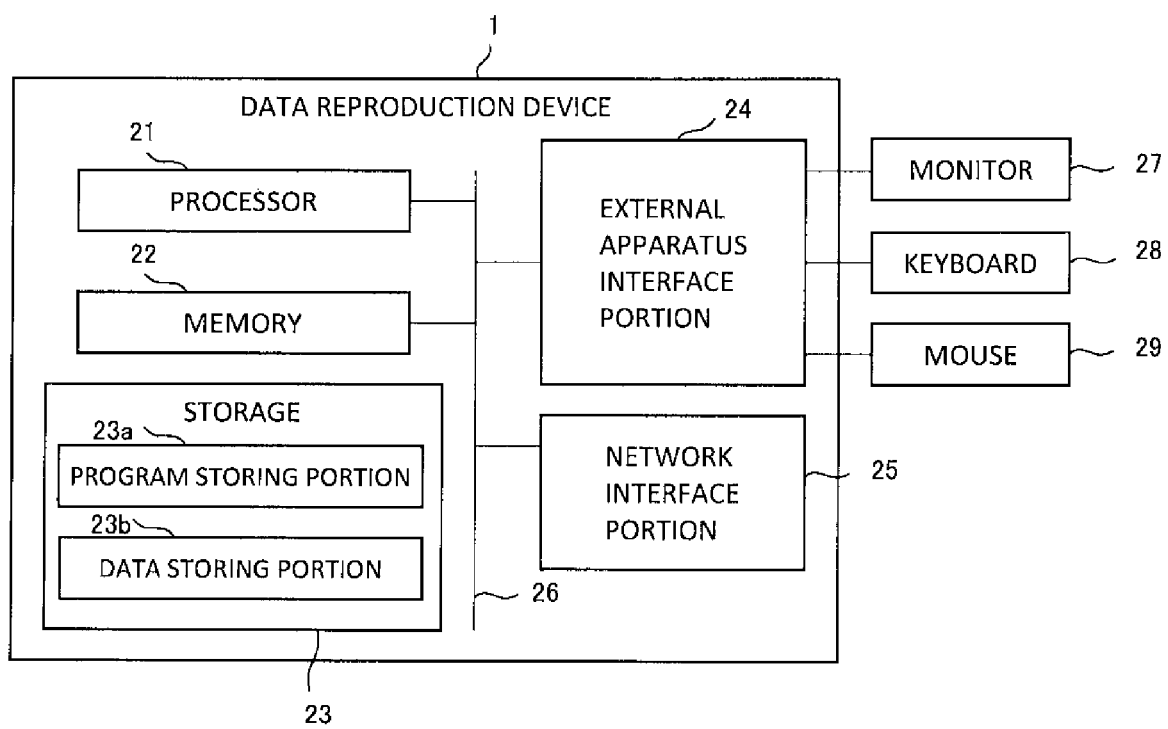
FIG. 8 is a diagram showing an example of a hardware configuration of the data reproduction device 1.

FIG. 8 is a diagram showing an example of a hardware configuration of the data reproduction device 1. The data reproduction device 1 is provided with a processor 21, a memory 22 as a short-term storage device, a storage 23 as a long-term storage device such as a hard disk drive (HDD) and a solid state drive (SSD), an external apparatus interface portion 24, a network interface portion 25 and an internal bus 26. The processor 21, the memory 22, the storage 23, the external apparatus interface portion 24 and the network interface portion 25 are mutually connected via the internal bus 26.

The memory 22 is used as an operation area portion where data is temporarily stored or developed when the processor 21 executes various programs.

The storage 23 has a program storing portion 23a and a data storing portion 23b. The program storing portion 23a stores an operating system (OS) and various programs executed on the OS. The data storing portion 23b functions as the setting information storing portion 10, the process data definition information storing portion 11 and the process data storing portion 16 shown in FIG. 1. The data storing portion 23b stores filters, setting information and process data definition information in advance, and accumulates packets 7 which the network interface portion 25 has received and process data analysis information which the process data analyzing portion 15 has generated.

Though the program storing portion 23a and the data storing portion 23b are provided in one storage 23 in FIG. 8, the program storing portion 23a and the data storing portion 23b may be provided in separate storages, respectively.

The processor 21 functions as each portion of the data reproduction device 1 shown in FIG. 1 by executing the various programs stored in the program storing portion 23a of the storage 23. Specifically, the processor 21 functions as the process data definition information editing portion 12, the network searching portion 13, the process data acquiring portion 14, the process data analyzing portion 15 and the display portion 17 by executing the programs.

The external apparatus interface portion 24 is an interface for connecting external apparatuses such as the monitor 27, the keyboard 28 and the mouse 29 with the data reproduction device 1.

The network interface portion 25 is an interface for connecting the existing network 6 (the hub 5) and the data reproduction device 1. The packet 7 is received by the network interface portion 25.

The hardware configuration example of the data reproduction device 1 described above is similar in embodiments below.

Second Embodiment

Figure 9:
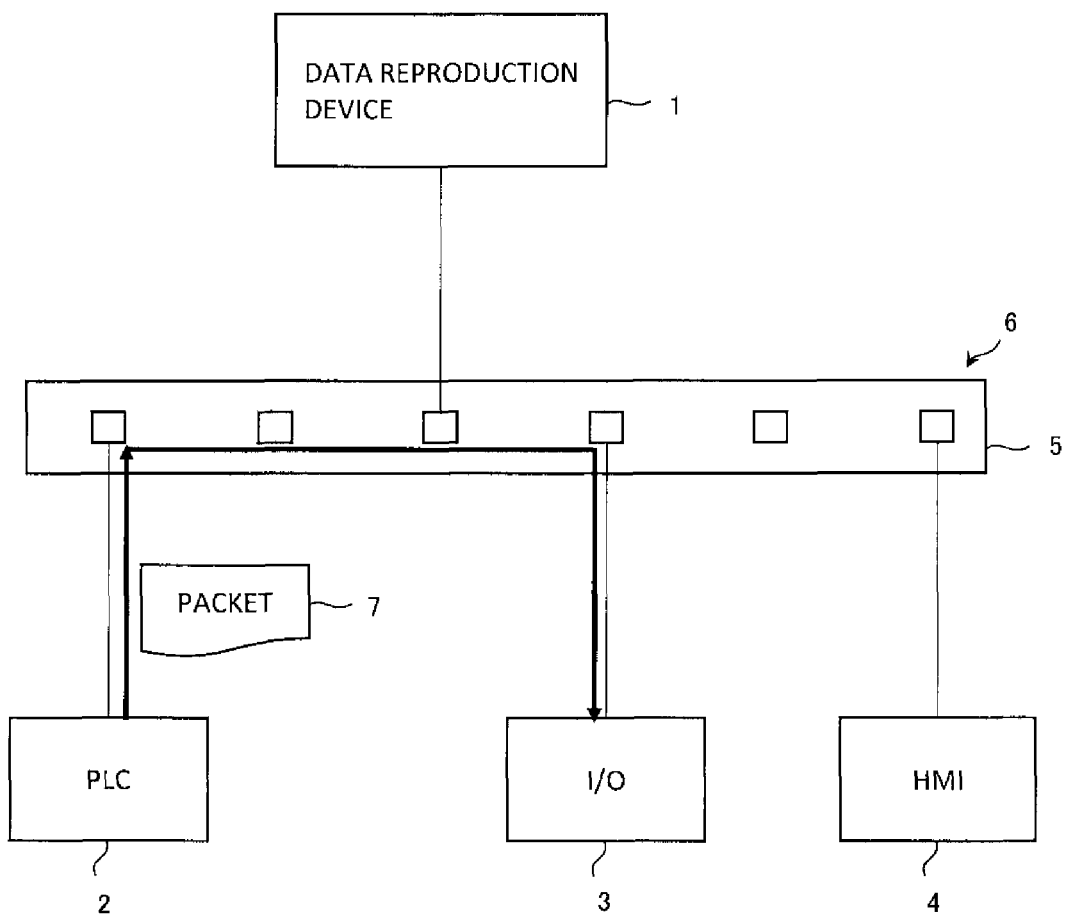
FIG. 9 is a diagram showing transmission of a packet by unicast.

Next, a second embodiment of the present disclosure will be described with reference to FIGS. 9 to 11. In the present embodiment, the network searching portion 13 is caused to execute the routine in FIG. 7 in the configuration shown in FIG. 10.

[Characteristic Control in Second Embodiment]

In the first embodiment described above, in a plant-monitoring control system, a packet transmitted by broadcast is targeted as shown in FIG. 3. FIG. 9 is a diagram showing transmission of a packet by unicast. In unicast, a packet is transmitted only to an apparatus specified as a transmission destination address and is not transmitted to other apparatuses. In the example shown in FIG. 9, a packet 7 transmitted from the PLC 2 to the I/O 3 is not transmitted to the data reproduction device 1 or the HMI 4. In a second embodiment, a packet transmitted by unicast in a plant-monitoring control system is targeted.

Figure 10:
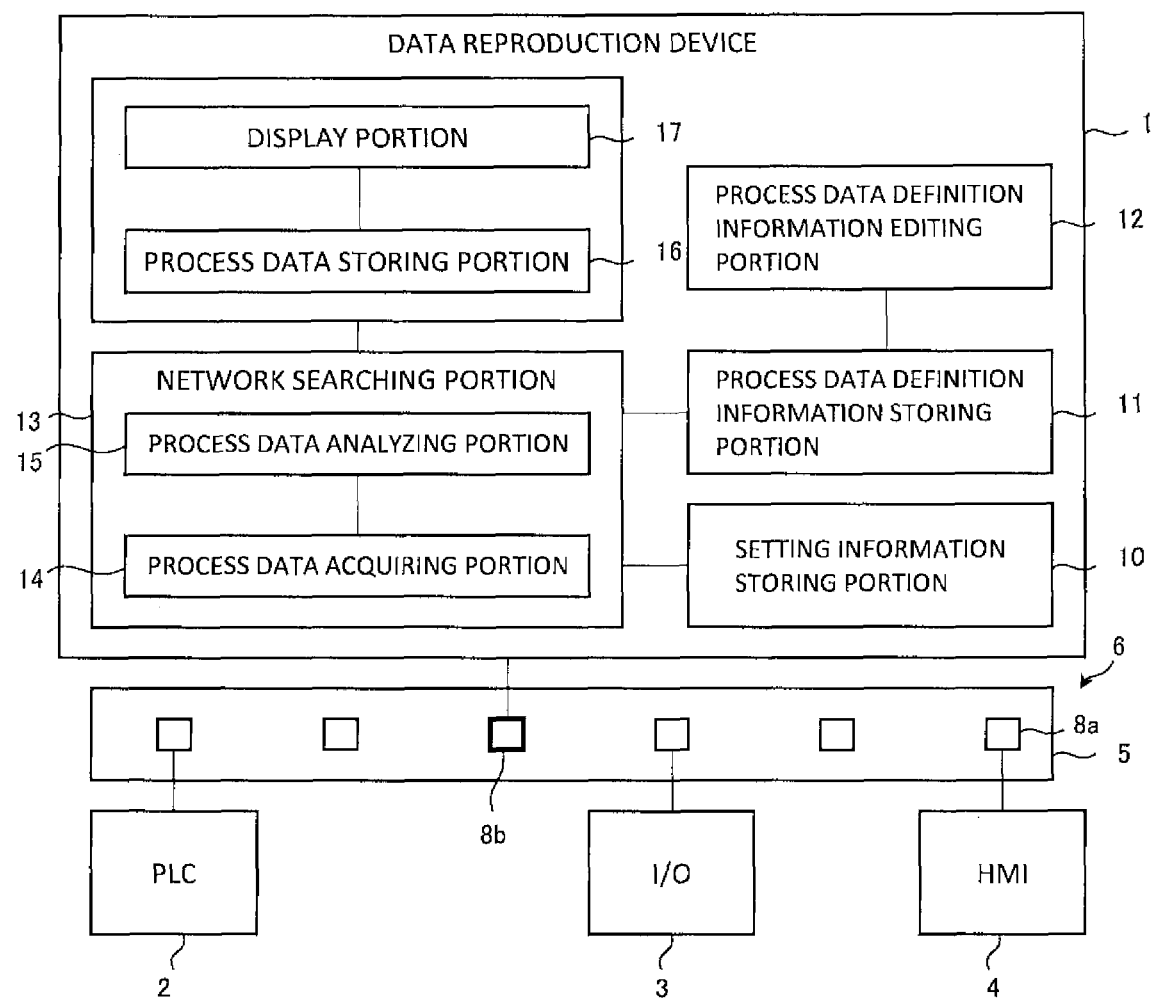
FIG. 10 is a conceptual configuration diagram of an existing plant-monitoring control system and a data reproduction device according to a second embodiment of the present disclosure.

FIG. 10 is a conceptual configuration diagram of an existing plant-monitoring control system and a data reproduction device according to the second embodiment of the present disclosure. A data reproduction device 1 according to the second embodiment is similar to the first embodiment.

An existing plant-monitoring control system shown in FIG. 10 is similar to the configuration shown in FIG. 1 except for a point that the hub 5, which is a network line concentrator, is provided with both of a normal port 8a and a mirror port 8b. The PLC 2, the I/O 3 and the HMI 4 are connected to the normal port 8a, and the data reproduction device 1 is connected to the mirror port 8b.

The mirror port 8b is provided with a function of mirroring data which the normal port 8a transmits/receives. Mirroring is a function of copying a packet 7 transmitted to a particular connection destination as in unicast and transferring it to a port for which a mirroring setting is made. In general, mirroring is often used to confirm a packet among apparatuses at the time of trouble diagnosis of a network and the like.

Figure 11:
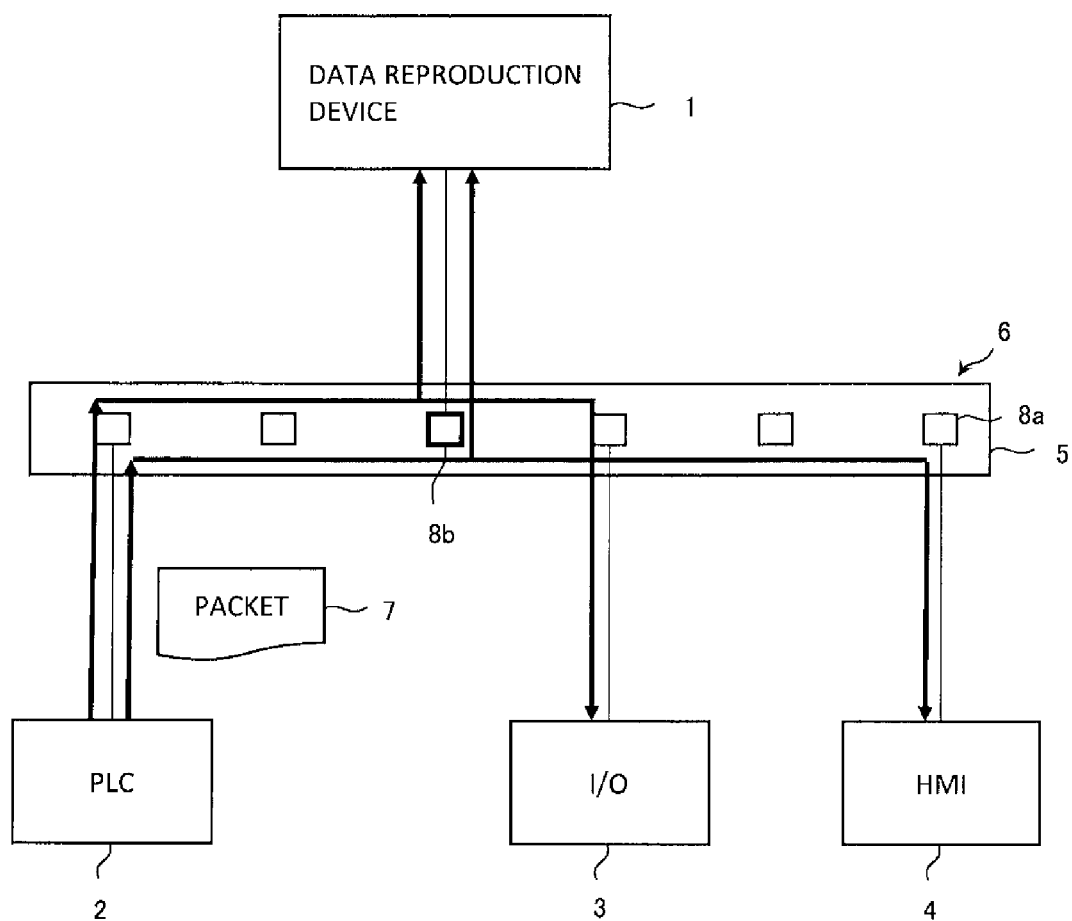
FIG. 11 is a diagram showing transmission of a packet in the second embodiment.

FIG. 11 is a diagram showing transmission of a packet in the second embodiment. As shown in FIG. 11, when the data reproduction device 1 is connected to the mirror port 8b for which a mirroring setting is made, a packet 7 transmitted from the PLC 2 to the I/O 3 is not only transmitted to the I/O 3 but also transmitted to the data reproduction device 1 from the mirror port 8b. Similarly, a packet 7 transmitted from the PLC 2 to the HMI 4 is not only transmitted to the HMI 4 but also transmitted to the data reproduction device 1 from the mirror port 8b.

A configuration of the data reproduction device 1 is similar to the first embodiment. The packet 7 received via the mirror port 8b is processed by the network searching portion 13, and process data analysis information is accumulated in the process data storing portion 16 (FIG. 7).

<Effects>

As described above, according to the second embodiment, it is possible to, without changing the program of the PLC 2 that is operating and settings for the input/output device, acquire process data transmitted by unicast in the existing network 6, by using the hub 5 for which a mirroring setting can be made. Further, the acquired process data at each time is associated with an input/output point of the modules which the input/output device has and can be displayed in a tabular or graphical form.

Therefore, according to the data reproduction device 1, it is possible to, without increasing a communication load of an existing plant-monitoring control system, visually and intuitively grasp a monitoring control state of a plant in a short period and at a low cost.

Third Embodiment

Next, a third embodiment of the present disclosure will be described with reference to FIGS. 12 to 14. In the present embodiment, the network searching portion 13 is caused to execute the routine in FIG. 14 in the configuration shown in FIG. 13.

In the first and second embodiments, since address information including a transmission destination address, a data size and a data type are included in a header portion of a packet transmitted each time, it is possible analyze the packet. However, to include address information, a data size and a data type having the same content in a packet transmitted each time increases a size of transmit data and requires time for a transmission process, and, therefore, such a communication process cannot be said to be an efficient communication process. Therefore, it is desirable to, by transmitting the address information and information about the data size and the data type only when a PLC 2 and an input/output device mutually execute a connection destination confirmation process at the time of starting communication and, after the connection destination confirmation process, causing a header portion of a packet to be an ID to shorten the header portion and transmitting only the ID and process data, optimize the communication process.

Therefore, in the third embodiment, process data flowing through the existing network 6 which has such a communication mechanism is acquired without changing the program of the PLC 2 that is operating and settings for the input/output device.

Figure 12:
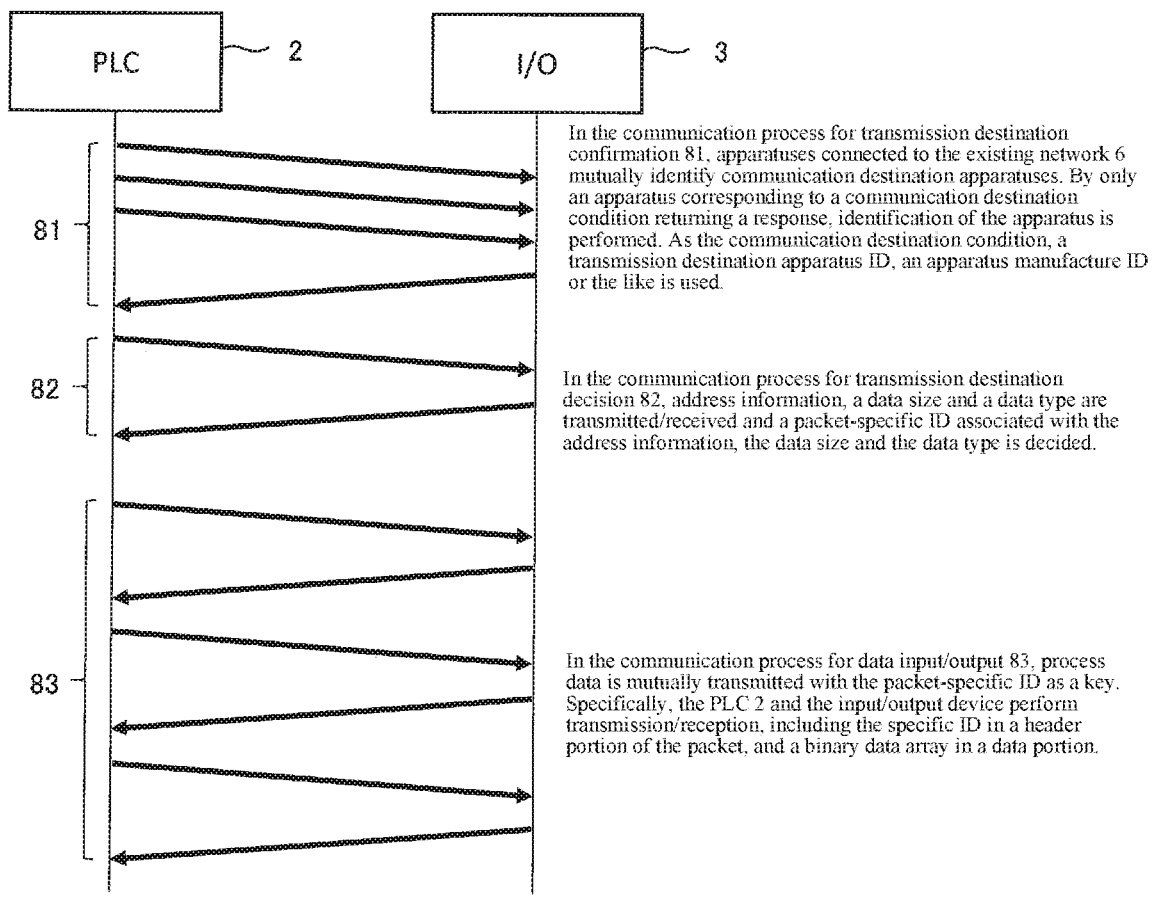
FIG. 12 is a diagram showing an example of handover of a packet for a plant-monitoring control system in which a communication process is optimized.

FIG. 12 is a diagram showing an example of handover of a packet in a plant-monitoring control system in which a communication process is optimized. As connection destination confirmation processes before transmitting process data from the PLC 2 to the I/O 3, a communication process for transmission destination confirmation 81 and a communication process for transmission destination decision 82 are executed.

First, the communication process for transmission destination confirmation 81 is executed. In the communication process for transmission destination confirmation 81, apparatuses connected to the existing network 6 mutually identify communication destination apparatuses. By only an apparatus corresponding to a communication destination condition returning a response, identification of the apparatus is performed. As the communication destination condition, a transmission destination apparatus ID, an apparatus manufacturer ID or the like is used.

Next, for the apparatus corresponding to the communication destination condition, the communication process for transmission destination decision 82 is executed. In the communication process for transmission destination decision 82, address information, a data size and a data type are transmitted/received and a packet-specific ID associated with the address information, the data size and the data type is decided.

After the connection destination confirmation processes, a communication process for data input/output 83 is executed. In the communication process for data input/output 83, process data is mutually transmitted with the packet-specific ID as a key. Specifically, the PLC 2 and the input/output device perform transmission/reception, including the specific ID in a header portion of the packet, and a binary data array in a data portion. As described in the first embodiment, the binary data array is such that states of the input points of the input modules which the input/output device has and states of the output points of the output modules are arrayed.

In the third embodiment, a packet receiving process for the connection destination confirmation processes and a conditional branch in which various communication processes are classified, and a data analysis method is changed according to the communication processes to perform processing are required in addition to the second embodiment.

Figure 13:
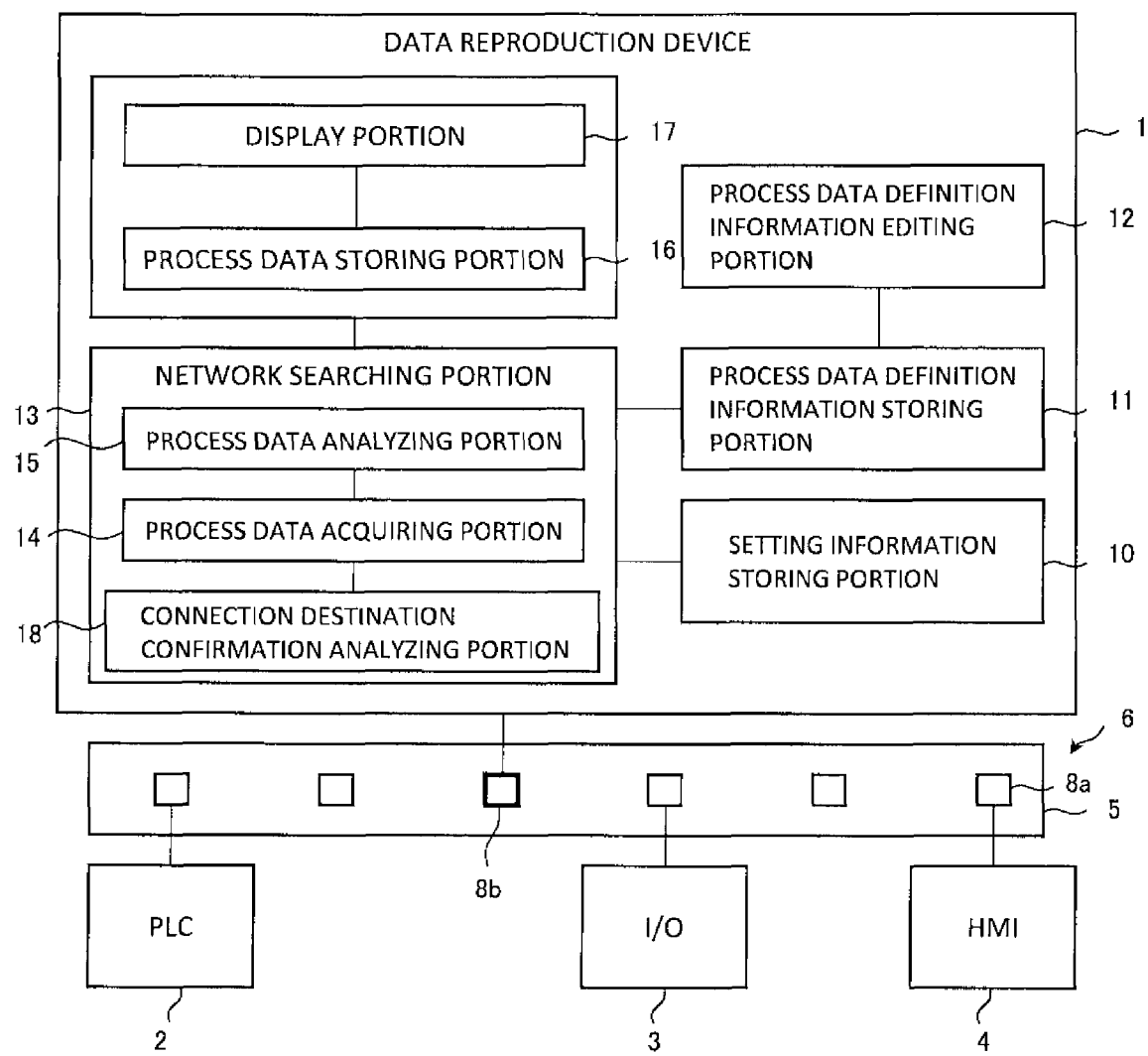
FIG. 13 is a conceptual configuration diagram of an existing plant-monitoring control system and a data reproduction device according to a third embodiment of the present disclosure.

FIG. 13 is a conceptual configuration diagram of an existing plant-monitoring control system and a data reproduction device according to the third embodiment of the present disclosure. A data reproduction device 1 shown in FIG. 13 is similar to the configuration shown in FIG. 10 except for a point that a connection destination confirmation analyzing portion 18 is added to the network searching portion 13. That is, similarly to the second embodiment, the PLC 2, the I/O 3 and the HMI 4 are connected to the normal port 8a, and the data reproduction device 1 is connected to the mirror port 8b. Therefore, a packet 7 transmitted from the PLC 2 to the I/O 3 is not only transmitted to the I/O 3 but also transmitted to the data reproduction device 1 from the mirror port 8b. Similarly, a packet 7 transmitted from the PLC 2 to the HMI 4 is not only transmitted to the HMI 4 but also transmitted to the data reproduction device 1 from the mirror port 8b.

The connection destination confirmation analyzing portion 18 acquires a specific ID associated with at least address information, which is decided in the connection destination confirmation processes between the PLC 2 and the input/output device (the I/O 3, the HMI 4) and associates the specific ID with setting information. As stated in the first embodiment, the setting information is information in which address information and a plurality of pieces of offset information are associated and is stored in the setting information storing portion 10. With the address information associated with the specific ID as a key, the connection destination confirmation analyzing portion 18 acquires setting information which includes the address information and associates the specific ID and the setting information. Thereby, the process data analyzing portion 15 can refer to setting information from a specific ID included in a packet to analyze process data.

<Flowchart>

Figure 14:
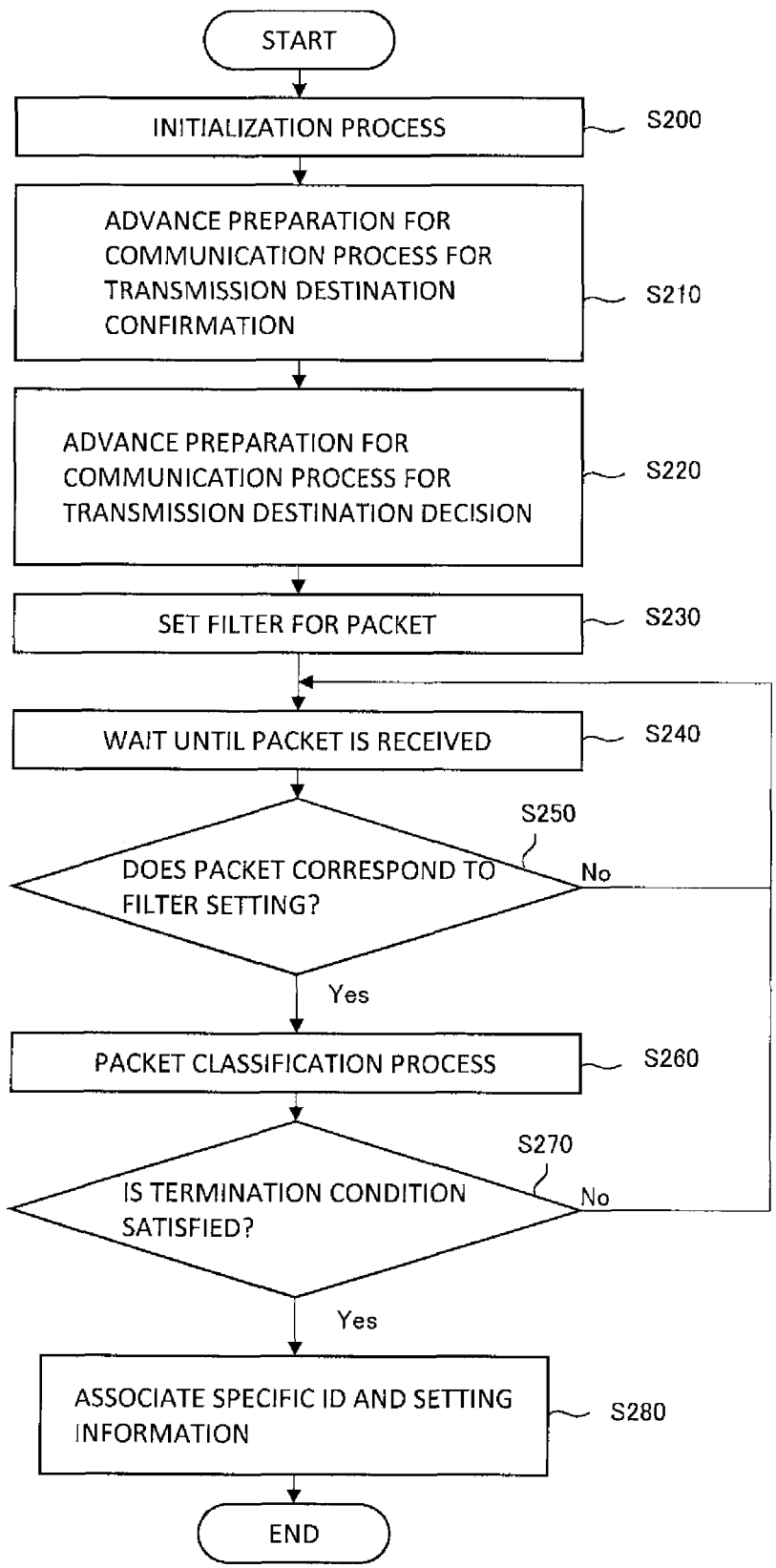
FIG. 14 is a flowchart for illustrating a process routine which a data reproduction device 1 according to the third embodiment of the present disclosure executes.

FIG. 14 is a flowchart for illustrating a process routine which the data reproduction device 1 according to the third embodiment of the present disclosure executes.

At step S200, an initialization process is executed. Since a packet-specific ID is changed by communication initialization at the time of powering on/off the PLC 2 or at the time of attaching/detaching a network cable, the initialization process is also executed in the data reproduction device 1 also.

Next, at step S210, the data reproduction device 1 performs advance preparation for a communication process for transmission destination confirmation in order to secure an area for storing data of the communication process for transmission destination confirmation 81. The area for storing the data is prepared in the data storing portion 23b.

Next, at step S220, the data reproduction device 1 performs advance preparation for a communication process for transmission destination decision in order to secure an area for storing data of the communication process for transmission destination decision 82. The area for storing the data is prepared in the data storing portion 23b.

Next, at step S230, the network searching portion 13 sets a filter so that only a packet for transmission destination confirmation or a packet for transmission destination decision is received. The filter specifying a packet format is stored in the setting information storing portion 10.

Next, at step S240, the network searching portion 13 waits until a packet is received.

If a packet is received, the network searching portion 13 judges whether a format of the received packet corresponds to the filter at step S250. If the judgment condition is satisfied, a process of S260 is executed next. On the other hand, if the judgment condition is not satisfied, the flow returns to step S240, and the process is continued.

At step S260, the network searching portion 13 executes a packet classification process. The packet is classified as a packet for transmission destination confirmation or a packet for transmission destination decision. The packet for transmission destination confirmation is stored into the area for storing data of the communication process for transmission destination confirmation 81. The packet for transmission destination decision is stored into the area for storing data of the communication process for transmission destination decision 82.

At step S270, it is judged whether a termination condition is satisfied. Until the termination condition is satisfied, packet receiving and the classification process are continued. The termination condition is satisfied when set time such as several tens of seconds elapses after start or when the number of packets received after start exceeds an upper limit such as several thousands to several tens of thousands. When this termination condition is satisfied, the collection process of the third embodiment which is required for packet analysis is completed.

At step S280, the connection destination confirmation analyzing portion 18 associates a specific ID and setting information. In the data of the communication process for transmission destination decision 82 stored at step S260, the specific ID associated with address information, a data size and a data type is included. The connection destination confirmation analyzing portion 18 associates the specific ID and the setting information which includes the address information related to the specific ID. After that, the present routine is ended.

After that, in another routine, the network searching portion 13 receives a packet of the communication process for data input/output 83 in FIG. 12. In the packet, a specific ID and a binary data array in which pieces of process data are arrayed are stored. The process data analyzing portion 15 decomposes the binary data array into a plurality of pieces of process data based on setting information associated with the specific ID. Furthermore, for each of the plurality of pieces of process data, the process data analyzing portion 15 associates the one piece of process data among the plurality of pieces of process data, packet receiving time and the process data definition information to obtain one piece of process data analysis information. The process data analysis information is accumulated into the process data storing portion 16. Specifically, a process equal to steps S130 to S180 in FIG. 7 is executed.

<Effects>

According to the third embodiment of the present disclosure, it is possible to, without changing the program of the PLC 2 that is operating and settings for the input/output device, acquire process data transmitted by unicast in the existing network 6 in a plant-monitoring control system in which a communication process is optimized. Further, the acquired process data at each time is associated with an input/output point of the modules which the input/output device has and can be displayed in a tabular or graphical form.

Therefore, according to the data reproduction device 1, it is possible to, without increasing a communication load of an existing plant-monitoring control system, visually and intuitively grasp a monitoring control state of a plant in a short period and at a low cost.

REFERENCE SIGNS LIST

1 Data reproduction device
2 Programmable logic controller (PLC)
3 I/O
4 Human machine interface (HMI)
5 Hub
6 Existing network
7 Packet
8a Normal port
8b Mirror port
10 Setting information storing portion
11 Process data definition information storing portion
12 Process data definition information editing portion
13 Network searching portion
14 Process data acquiring portion
15 Process data analyzing portion
16 Process data storing portion
17 Display portion
18 Connection destination confirmation analyzing portion
21 Processor
22 Memory
23 Storage
23a Program storing portion
23b Data storing portion
24 External apparatus interface portion
25 Network interface portion
26 Internal bus
27 Monitor
28 Keyboard
29 Mouse
31, 32 Input module A, Input module B
33, 34 Output module A, Output module B
41 Header portion
42 Data portion
43, 43a, 43b Transmission source address
44 Transmission destination address
45, 46 Data of input module A, Data of input module B
47, 48 Data of output module A, Data of output module B
51, 52, 53, 54 Start address
61, 62, 63, 64 Data size
71 Variable name
72 Comment
73 Byte address offset
74 Bit address offset
75 Data type
81 Communication process for transmission destination confirmation
82 Communication process for transmission destination decision
83 Communication process for data input/output

The invention claimed is:

1. A data reproduction device for a plant-monitoring control system to be newly connected to an existing network in which a packet is transmitted and received between a programmable logic controller that is operating and an input or output device, the data reproduction device for the plant-monitoring control system comprising:
   a processor; and
   a memory, the memory comprising a setting information storing portion, a process data definition information storing portion, a process data definition information editing portion, a process data acquiring portion, a process data analyzing portion, a process data storing portion, a display portion, and a connection destination confirmation analyzing portion,
   the processor configured to perform:
   storing setting information in which address information including a transmission destination address and a transmission source address are stored in a header portion of the packet and a plurality of pieces of offset information specifying separation positions for decomposing a binary data array stored in a data portion of the packet by relative addresses from a start address of the data portion are associated;
   storing, for each of the plurality of pieces of the offset information, process data definition information in which one piece of the offset information among the plurality of pieces of the offset information, the address information, a unique variable name for a combination of the one piece of the offset information and the address information, and a comment explaining a meaning of the unique variable name are associated;
   editing the unique variable name and the comment included in the process data definition information;
   acquiring, among packets flowing through the existing network, a packet in which the data reproduction device for the plant-monitoring control system is not specified in the address information stored in the header portion of the packet, and acquiring the binary data array stored in a data portion of the acquired packet;
   decomposing the binary data array acquired by the process data acquiring portion into a plurality of pieces of process data showing states of input and output points of the input or output device based on the setting information and, for each of the plurality of pieces of the process data, associating one piece of the process data among the plurality of pieces of the process data, packet receiving time, and the process data definition information to obtain one piece of process data analysis information;

storing the one piece of the process data analysis information; and searching for information corresponding to a specified variable name from a plurality of pieces of the process data analysis information stored in the process data storing portion and displaying the search information as time-series data.

2. The data reproduction device for the plant-monitoring control system according to claim 1, wherein the existing network comprises a network line concentrator comprising a normal port and a mirror port mirroring data that the normal port transmits and receives; and the programmable logic controller is connected to the normal port, and the data reproduction device is connected to the mirror port.

3. The data reproduction device for the plant-monitoring control system according to claim 2, the processor further configured to perform acquiring a specific ID associated with at least the address information, the specific ID being decided in a connection destination confirmation process between the programmable logic controller and the input or input device, and associating the specific ID with the setting information; wherein after the connection destination confirmation process, the programmable logic controller and the input or output device transmits and receives a packet in which the specific ID is attached to the binary data array; and the processor further configured to decompose the binary data array into the plurality of pieces of the process data showing the states of the input or output points of the input or output device based on the setting information associated with the specific ID and, for each of the plurality of pieces of the process data, and associate one piece of the process data among the plurality of pieces of the process data, the packet receiving time, and the process data definition information to obtain the one piece of process data analysis information.

* * * * *